(12) United States Patent  
Chan

(10) Patent No.: US 7,427,890 B2
(45) Date of Patent: Sep. 23, 2008

(54) CHARGE PUMP REGULATOR WITH MULTIPLE CONTROL OPTIONS

(75) Inventor: Johnny Chan, Fremont, CA (US)

(73) Assignee: Atmel Corporation, San Jose, CA (US)

( * ) Notice: Subject to any disclaimer, the term of this patent is extended or adjusted under 35 U.S.C. 154(b) by 70 days.

(21) Appl. No.: 11/618,049

(22) Filed: Dec. 29, 2006

(65) Prior Publication Data

US 2008/0157729 A1    Jul. 3, 2008

(51) Int. Cl.
*G05F 1/10* (2006.01)
(52) U.S. Cl. ...................................... 327/536
(58) Field of Classification Search ............... 327/535, 327/536, 537, 538, 539, 543
See application file for complete search history.

(56) References Cited

U.S. PATENT DOCUMENTS

| | | | |
|---|---|---|---|
| 6,157,243 A * | 12/2000 | Tailliet | ......................... 327/536 |
| 6,236,261 B1 * | 5/2001 | Kim et al. | ..................... 327/540 |
| 6,597,603 B2 | 7/2003 | Lambrache et al. | |
| 6,600,692 B2 | 7/2003 | Tanzawa | |
| 6,724,241 B1 | 4/2004 | Bedarida et al. | |
| 6,771,200 B2 | 8/2004 | Frulio et al. | |
| 7,049,880 B2 | 5/2006 | Sivero et al. | |
| 7,064,529 B2 | 6/2006 | Telecco | |
| 7,116,088 B2 | 10/2006 | Tran et al. | |
| 7,120,061 B2 | 10/2006 | Daga | |
| 7,145,318 B1 | 12/2006 | Chan et al. | |
| 7,279,961 B2 * | 10/2007 | Chan et al. | ................... 327/540 |
| 7,315,194 B2 * | 1/2008 | Shiga et al. | ................... 327/535 |
| 2006/0119418 A1 | 6/2006 | Merandat et al. | |
| 2006/0186869 A1 | 8/2006 | Telecco | |

* cited by examiner

*Primary Examiner*—Jeffrey S Zweizig
(74) *Attorney, Agent, or Firm*—Schwegman, Lundberg & Woessner, P.A.

(57) ABSTRACT

A voltage generator has a control circuit for controlling a dual-mode charge pump that has multiple control options provided by an optional pull down control signal and an optional stop control signal. The dual-mode charge pump is enabled by a high voltage enable control signal from a control circuit to provide a high-voltage output voltage level Vpp or a low-voltage output voltage level Vdd. A current sink transistor is coupled from the output of the dual-mode charge pump to a ground reference through a current sink control switch transistor that is turned on by the optional pull down control signal. A dual output op amp compares a fixed voltage reference to a voltage proportional to the output voltage of the charge pump. The op amp has a high voltage output signal terminal that turns on the current sink transistor and a low voltage output signal that is coupled to the control circuit.

25 Claims, 4 Drawing Sheets

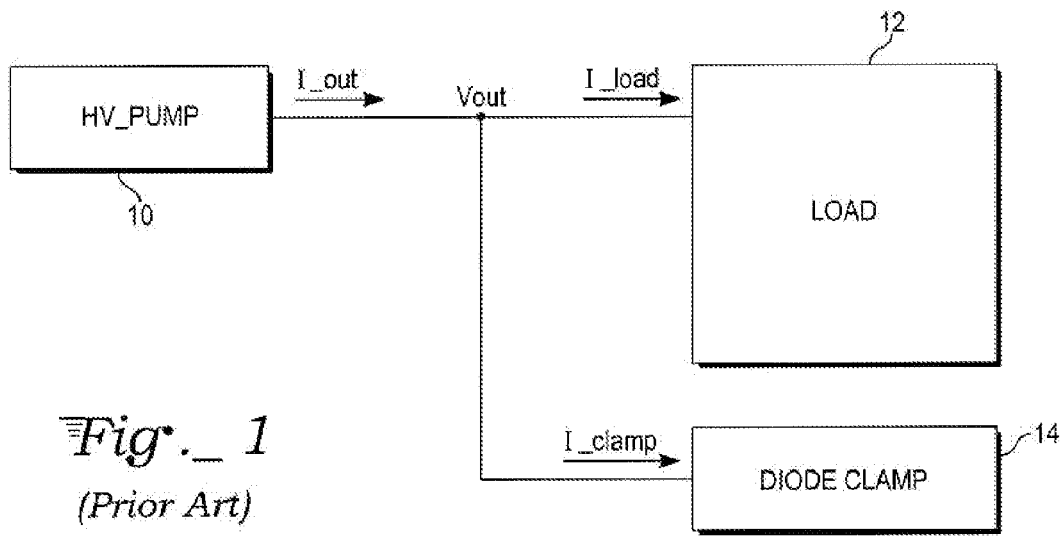
Fig._1
*(Prior Art)*
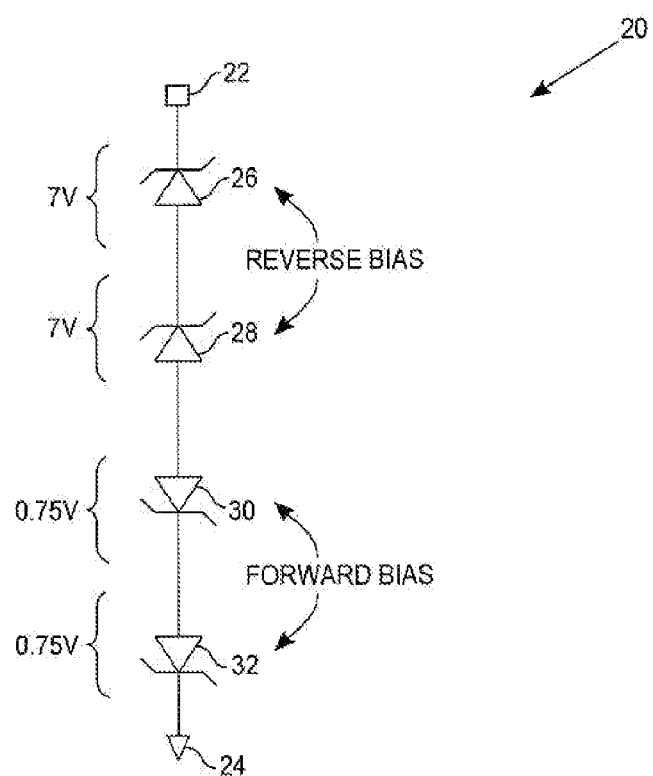
Fig._2
*(Prior Art)*

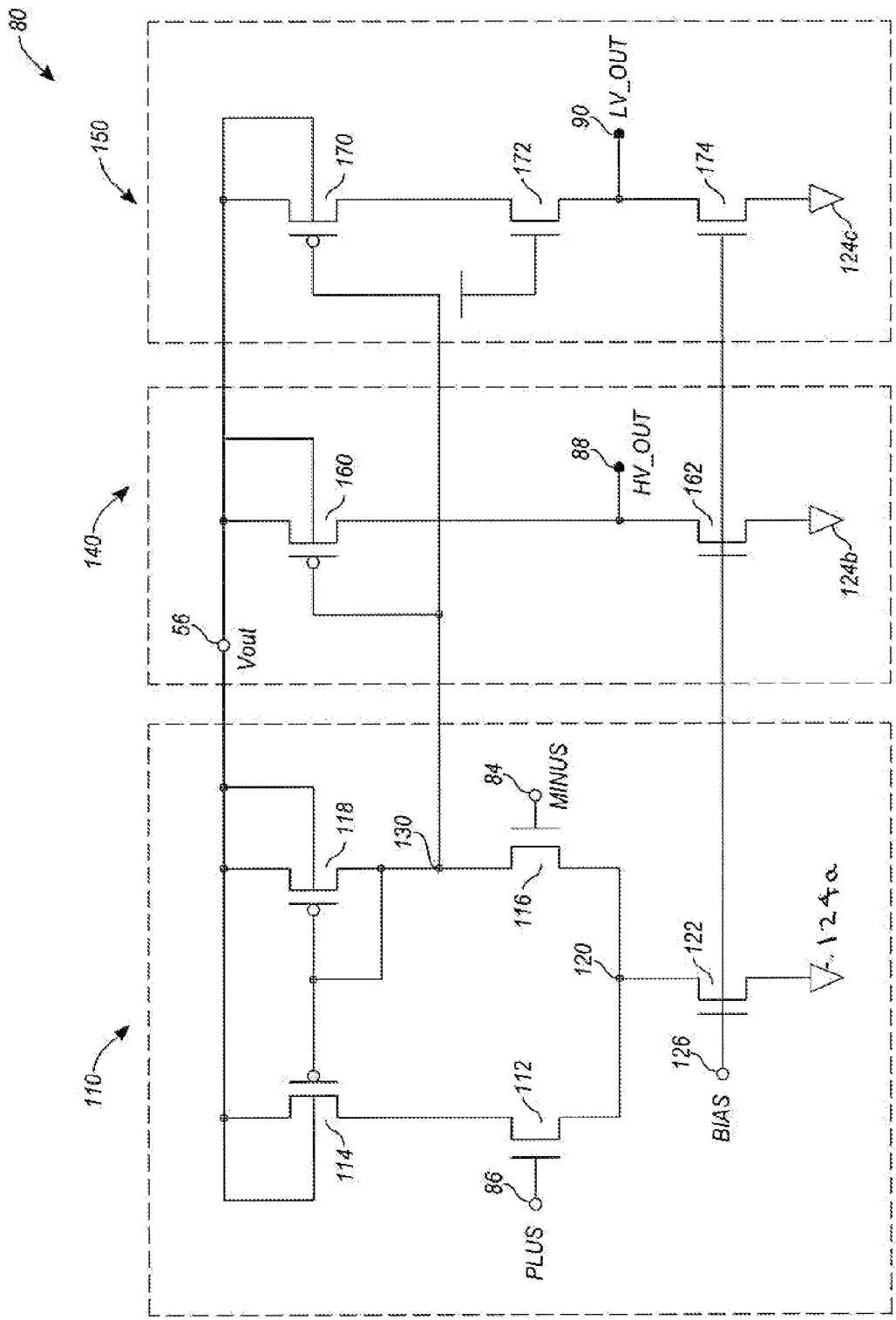
Fig._4

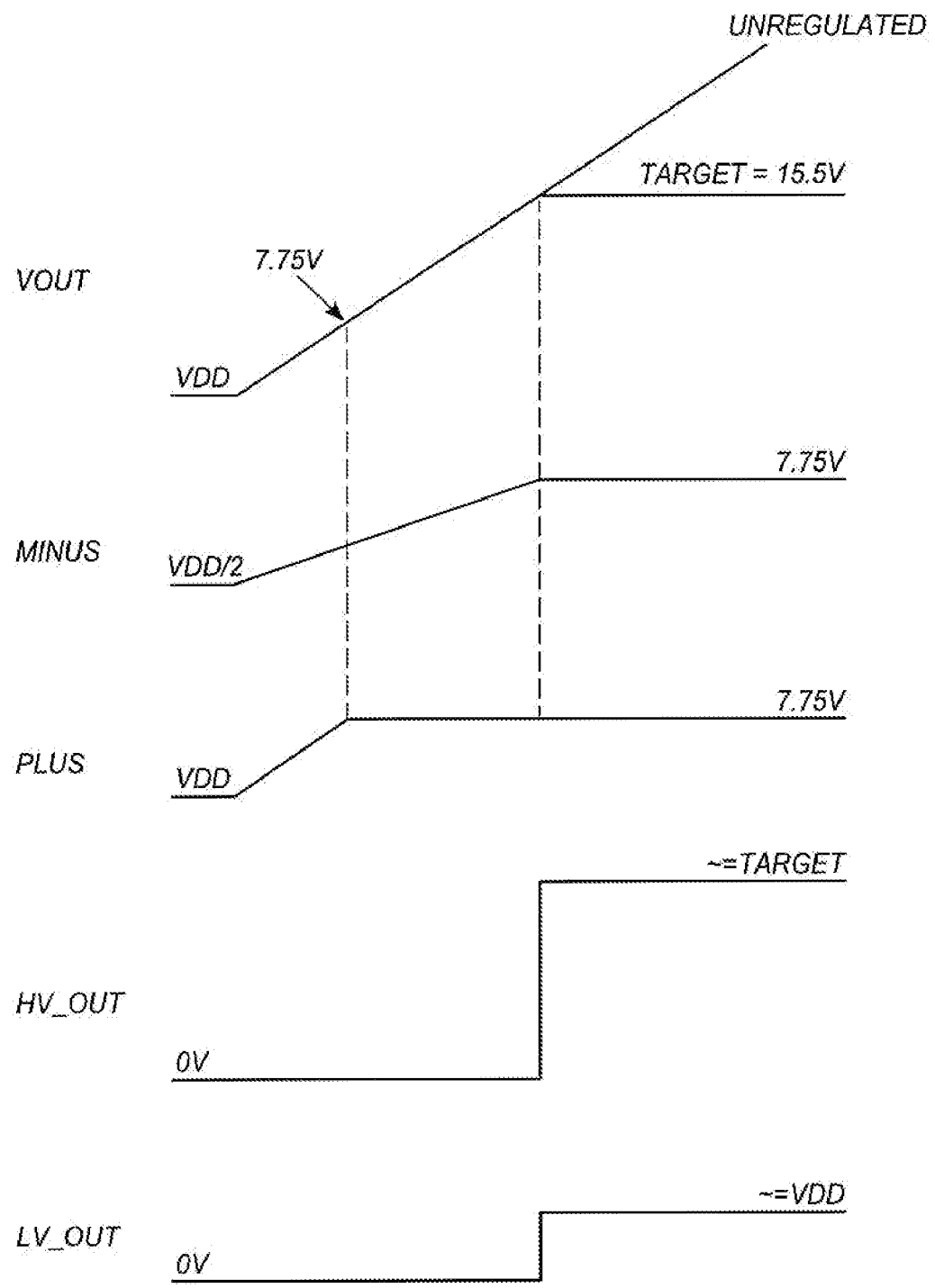
Fig._5

CHARGE PUMP REGULATOR WITH MULTIPLE CONTROL OPTIONS

TECHNICAL FIELD

The present invention relates to charge pumps and, more particularly, to a charge pump regulators.

BACKGROUND

With reference to FIG. 1, a conventional high-voltage charge pump circuit 10, such as a Dickson charge pump circuit, typically provides an output voltage Vout with two voltage levels for operation of a non-volatile memory. One output voltage is a low-voltage Vdd supply voltage that is used for read operations of, for example, a non-volatile memory load 12. For erasing and programming operations of the non-volatile memory load 12, a high-voltage Vpp voltage is required. The high-voltage Vpp voltage is used in the non-volatile memory load 12 for high-voltage drivers, latches, x-decoders, y-decoders, etc.

One method of regulating the high-voltage output of the charge pump circuit 10 uses a diode clamp circuit 14 to hold the high voltage Vout voltage at a fixed value and to absorb excess current as T_clamp in the diode clamp circuit 14, while the high-voltage charge pump circuit 10 delivers an output current I_out and the load 12 takes a load current I_load.

FIG. 2 illustrates a typical series Zener diode clamp circuit 20 that is connected between a Vout terminal 22 of a charge pump and a ground reference terminal 24. The output voltage and current of a typical charge pump circuit are inversely related, such that an increase in output current produces a decrease in output voltage and a decrease in output current produces an increase in output voltage. To provide a fixed output voltage, a Zener diode clamp circuit requires the charge pump circuit to produce excess output current. First and second reverse biased Zener diodes 26, 28 each have reverse-bias voltage drops of 7 volts and first and second forward biased Zener diodes 30, 32 each have forward-bias voltage drops of 0.75 volts. The total voltage drop for the Zener diode clamp circuit 20 is 15.5 volts, which clamps the Vout voltage at a Vpp voltage level of 15.5 volts. This type of high-voltage charge pump circuit 10 with a Zener diode clamp circuit 20 provides a passive technique for regulating the Vout voltage at a high-voltage Vpp level. For practical circuits, the Vout voltage level varies somewhat as a function of the load current. This type of regulation scheme has the charge pump circuit producing excess current that is dumped in the diode clamp circuit 14 to maintain Vout at a substantially fixed Vout level.

SUMMARY OF THE INVENTION

The present invention is a voltage generator system having multiple control options. A dual-mode voltage generator has a Vout output terminal at which is provided a Vout voltage level. The dual mode voltage generator has a high voltage enable input terminal at which is provided a high voltage enable control signal that is active to provide a high voltage output voltage level Vpp and which is inactive to provide a low-voltage output voltage level Vdd. A voltage generator control circuit has an output terminal that is coupled to the high voltage enable input terminal. The voltage generator control circuit has a first input terminal which receives an option stop control signal which is inactive to provide the low-voltage output voltage level Vdd. The voltage generator control circuit has a second input terminal which receives a low voltage out signal. A current sink transistor is provided with a current sink control switch transistor that is activated to couple the current sink transistor between the Vout output terminal and a ground reference terminal. The current sink transistor has a gate terminal and the current sink control switch has a control terminal at which is received an option pull down control signal which is active to operate the current sink control switch.

A dual-output op amp is provided that has a power terminal coupled to the Vout output terminal of the voltage generator, that has a minimum input terminal, that has a plus input terminal, that has a high voltage out terminal which is coupled to a gate terminal of the current sink transistor, and that has a low voltage out terminal at which is provided logic level output signals and which is coupled to the second input terminal of the voltage generator control circuit.

A reference voltage source provides a fixed reference voltage at an output terminal which is coupled to the plug input terminal of the dual output op amp. A voltage divider circuit is coupled between the Vout output terminal and the group reference terminal and has an output terminal which is coupled to the minus input terminal of the dual output op amp to provide an output signal that is proportional to the Vout voltage level.

An active high voltage enable control signal causes the dual-mode voltage generator to provide a high-voltage output voltage level and an inactive high voltage enable control signal causes the dual-mode voltage generator to provide a low-voltage Vdd output voltage level. An active option pull down control signal causes the switch to close and the current sink transistor to be active.

The present invention also includes a control circuit that provides multiple control options for controlling a dual-mode high-voltage charge pump. The control circuit includes a dual-mode high-voltage charge pump control circuit. The dual-mode high-voltage charge pump control circuit is adapted to control operation of a dual-mode high-voltage charge pump. The high-voltage charge pump control circuit has an output terminal that is adapted to be coupled to an enable input terminal of the dual-mode high-voltage charge pump. The high-voltage charge pump control circuit has a first input terminal that receives an OPTION_STOP control signal. The high-voltage charge pump control circuit has a second input terminal that receives a LV_OUT logic control signal.

A current sink transistor is coupled in series with an OPTION_PD switch transistor between the high-voltage generator output terminal and a ground reference terminal. The option pull down switch transistor has a gate that receives the option pull down control signal to couple the current sink transistor to the ground reference terminal.

A dual output op amp is provided that has a power terminal coupled to the dual-mode high-voltage charge pump output terminal. The dual output op amp has a minus input terminal and a plus input terminal. The dual output op amp has a high voltage out terminal coupled to a gate terminal of the shunt transistor. The dual output op amp has a low voltage out terminal coupled to the second input terminal of the dual-mode high-voltage charge pump control gate.

A reference voltage circuit includes a first resistor coupled from the dual-mode high-voltage charge pump output terminal to the minus input terminal of the dual output op amp. The reference voltage circuit includes a Zener diode configuration coupled between the plus input terminal of the dual output op amp and the ground reference terminal.

A voltage divider circuit includes a second resistor coupled from the high-voltage generator output terminal to the minus input terminal of the dual output op amp and includes a third resistor that is coupled between the plus input terminal of the dual output op amp and the ground reference terminal.

An active high voltage enable control signal causes the dual-mode high-voltage charge pump to provide a high-voltage output voltage level. An inactive high voltage enable control signal causes the dual-mode high-voltage charge pump to provide a low-voltage Vdd output voltage level. An active option pull down control signal causes the switch to close and the current sink transistor to be active.

The present invention also includes a method of regulating a dual-mode charge pump using multiple control options. The method includes controlling a dual-mode charge pump circuit to provide a output voltage that includes low voltage Vout output voltage Vdd and a high voltage output voltage Vpp at a output terminal. A current sinking transistor is coupled between the Vout output terminal and a ground reference terminal through a current sink switch transistor. The method further includes supplying a fixed reference voltage and supplying a voltage divider output voltage that is proportional to the Vout output voltage. The fixed reference voltage is compared to the voltage divider output voltage and, if the voltage divider output voltage is less than the fixed reference voltage, providing a high voltage signal and also providing a logic level low voltage signal. The current sink transistor is activated with the high voltage out signal and the current sink switch is activated with an external option pull down signal, such that Vout is held constant and excess current from the charge pump is sunk to the ground reference through the activated current sink transistor. An external high voltage enable control signal is combined with the low voltage out control signal to provide an active high voltage enable signal at a high voltage enable terminal of the charge pump to turn on the charge pump and provide a high voltage Vout output voltage Vpp at a Vout output terminal of the charge pump. The charge pump is turned off when the high voltage enable control signal is inactive when the external option stop control signal is inactive or the low voltage out signal is inactive. Operation of the current sinking transistor is controlled by the high voltage out signal and the option pull down external control signal. Operation of the charge pump is controlled by the low voltage out control signal and the option stop control signal.

BRIEF DESCRIPTION OF THE DRAWINGS

The accompanying drawings, which are incorporated in and form a part of this specification, illustrate embodiments of the invention and, together with the description, serve to explain the principles of the invention;

FIG. 1 is a block diagram of a prior art high-voltage pump circuit that provides an output current Io and an output voltage Vout to a load and that is regulated with a diode voltage clamp regulator.

FIG. 2 is a circuit diagram of a prior art Zener diode voltage clamp circuit that has forward biased Zener diodes in series with reverse biased Zener diodes.

FIG. 4 is a circuit diagram of a dual-output op amp that is used in the dual-mode voltage generator of FIG. 5.

FIG. 5 is a timing chart of various voltages for the dual-mode voltage generator of FIG. 3.

DETAILED DESCRIPTION

Figure 3:
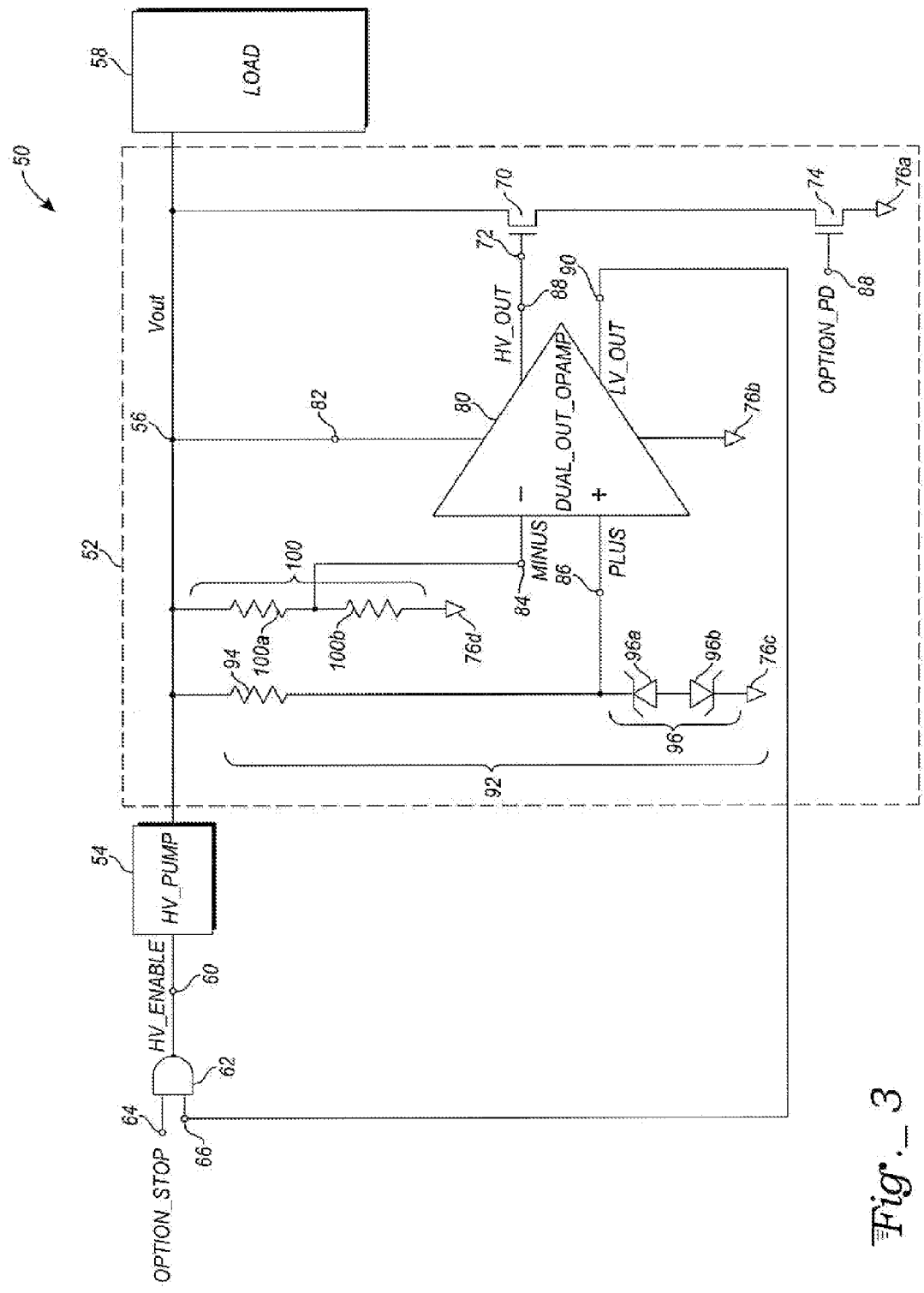
FIG. 3 is a block diagram of a dual-mode voltage generator having a control circuit with multiple control options according to the present invention.

FIG. 3 illustrates a voltage generator system 50 according to the present invention. A voltage generator controller circuit 52 is optionally controlled to operate the voltage generator system 50 in several ways. The HV_PUMP 54 is a voltage generator, such as a charge pump circuit that provides an output voltage Vout at a Vout output terminal 56. As described herein below, the HV_PUMP 54 is controlled to provide a high-voltage Vout voltage level Vpp and a low-voltage Vout voltage level Vdd, as required. The Vout voltage is provided to a LOAD 58, such as a non-volatile memory where the Vpp high-voltage Vout voltage level is used for, for example, high-voltage driver circuits, x-decoder circuits, y-decoder circuits, high-voltage latches, etc. The HV_PUMP 54 has a control input terminal 60 at which is provided a high voltage enable control signal which is set at an active HIGH logic level to provide a high-voltage Vout voltage level Vpp and which is at an inactive LOW logic level to provide a low-voltage Vout voltage level Vdd.

The high voltage enable control signal at the control input terminal 60 is provided from voltage generator control circuit as a 2-input AND gate 52. The 2-input AND gate 62 has a first input terminal 64 that receives an OPTION_STOP control logic signal. The 2-input AND gate 62 has a second input terminal 66 that receives a LV_OUT logic signal. When both of the input terminals 64, 66 are at logic HIGH levels, the high voltage enable signal at terminal 60 causes the high voltage charge pump 54 to produce a high-voltage Vout voltage level Vpp. For exemplary purposes of this instant description, Vpp is selected to be 15.5 volts and Vdd is a logic circuit supply voltage of two to five volts, as required. The present invention is applicable to a number of different Vpp and Vdd supply voltage levels.

A NMOS current sink transistor 70 has a gate terminal 72. The NMOS current sink transistor 70 has a drain terminal coupled to the Vout terminal 56 and a source terminal coupled to a drain terminal of a NMOS current sink control switch transistor 74 that serves as a switch to couple the current sink transistor between the Vout output terminal and a ground reference terminal 76a. A source terminal of the NMOS current sink control switch transistor 74 is coupled to the ground reference terminal 76a. A gate terminal 78 of the NMOS current sink control switch transistor 74 receives an OPTION_PD control signal. NMOS transistor 74 is a pull down transistor that functions as a switch.

The voltage generator controller circuit 52 also includes a dual-output op amp circuit 80. A power supply terminal 82 for the dual-output op amp circuit 80 is coupled to the Vout output terminal 56. The dual-output op amp circuit 80 has a ground reference terminal 76b. The dual-output op amp circuit 80 has a minus, or inverting, input terminal 84 and a plus, or non-inverting, input terminal 86. The dual-output op amp circuit 80 has a high voltage out terminal 88 that is coupled to the gate terminal 72 of the NMOS current sink transistor 70. The dual-output op amp circuit 80 also has a low voltage out terminal 90 at which is provided logic level output signals that are coupled to the second input terminal 66 of the voltage generator control circuit provided by the 2-input AND gate 62.

A reference voltage source 92 for the plus terminal 86 of the dual-output op amp circuit 80 provides a fixed reference voltage. The illustrated reference voltage source includes a first resistor 94 coupled from the Vout output terminal 56 to the plus input terminal 86 of the dual-output op amp 80. The reference voltage source 92 also includes a Zener diode configuration 96 coupled between the plus input terminal 86 of the dual-output op amp 80 and a ground reference terminal 76c. The Zener diode configuration 96 includes a reverse biased Zener diode 96a and a forward biased Zener diode 96b, that provides a fixed reference voltage and some degree of temperature compensation for the reference voltage at the plus terminal 86. As an example, the reverse biased Zener diode 96a has a voltage drop of 7.0 volts and the forward biased Zener diode 96b has a voltage drop of 0.75 volts for a reference voltage of 7.75 volts at the plus terminal 86 of the dual-output op amp 80.

The Zener diode configuration provides relative accuracy and some degree of temperature compensation. An alternative reference voltage source is a bandgap voltage reference that has good accuracy and temperature stability. However, a bandgap reference usually requires a large chip area.

Zener diode configurations are not used in low voltage Vdd supplies for logic circuits and the like because the reverse bias voltage of a Zener diode can exceed the Vdd voltage level. However, in non-volatile memory circuits, the charge pump internally provides a high voltage that can be used to supply a Zener diode configuration as a reference voltage source. In the present invention, even the high voltage charge pump 54 supplies current not only to a non-volatile memory load but also to a voltage regulation circuit, the regulation circuit is independent of loading on the charge pump 54 because the plus and minus voltages are not affected by current loads on the charge pump. As a consequence, the voltage regulator of the present invention can be used for non-volatile memory designs of varying density that have varying Vpp current requirements.

A voltage divider circuit 100 includes two series connected resistors 100a, 100b that are coupled in series between the Vout output terminal 56 and a ground reference terminal 76d. The common terminals of the resistors 100a, 100b provide a voltage divider output signal at the minus input terminal 84 that is proportional to the Vout voltage level at terminal 56. If the resistors 100a, 100b are equal, a voltage at the minus terminal 84 equal to the 7.75 volts at the plus terminal 86 would require a Vout voltage of 15.5 volts.

A voltage at the minus terminal 84 that exceeds the reference voltage of 7.75 volts causes the HV_OUT voltage at terminal 88 to go LOW to turn off the current sink transistor 70. This also causes the LV_OUT voltage at terminal 90 go LOW to turn off the HV_PUMP 54. A voltage at the minus terminal 84 that is less than the reference voltage of 7.75 volts causes the HV_OUT voltage at terminal 89 to go HIGH to turn on the NMOS current sink transistor. This also causes the LV_OUT voltage at terminal 90 to go HIGH and to turn on the HV PUMP, if the OPTION_STOP signal is also HIGH.

FIG. 4 illustrates an exemplary embodiment of the dual-output op amp circuit 80. An input stage is an n-channel common-source differential amplifier 110. One leg of the differential amplifier 110 includes a first NMOS transistor 112 and a first PMOS transistor 114. Another leg of the differential amplifier 110 includes a second NMOS transistor 116 and a second PMOS transistor 118. The sources of the NMOS transistors 112, 116 are coupled to a common source node 120. A current source for the differential amplifier is provided by a first NMOS current source transistor 122 that has a drain coupled to the common source node 120 and that has a source coupled to a ground reference terminal 124a. A gate terminal of the NMOS current source transistor 122 is coupled to a bias terminal 126, at which is provided a bias voltage to set the current level from the NMOS current-source transistor 122 for the common source differential amplifier 110. A gate terminal of the first NMOS transistor 112 is coupled to the plus input terminal 86 of FIG. 3. A gate terminal of the second NMOS transistor 116 is coupled to the minus input terminal 84 of FIG. 3.

The input stage of the n-channel common-source differential amplifier 110 has current-mirror loading provided by the first and second PMOS transistors 114, 118 that have their gates coupled together and their sources coupled to the Vout output terminal 56. The A drain of the first PMOS transistor 114 is coupled to the drain of the first NMOS transistor 112. The second PMOS transistor has its gate and drain coupled together in a diode configuration. A drain of the second PMOS transistor 118 is coupled to the drain of the second NMOS transistor 116 and to an output node 130.

The first and second PMOS transistors 114, 118 form a current mirror that provides a load for the differential amplifier 110. The current mirror load also provides conversion of the double-ended differential input signals plus and minus to a single-ended output signal at the output node 130.

The dual-output op amp circuit 80 includes a single-ended low voltage out output stage 150. The single-ended high voltage out output stage 140 includes a first PMOS output transistor 160 that has a gate terminal coupled to the output node 130 and a source terminal coupled to the Vout output terminal 56. A drain of the first PMOS output transistor 160 is coupled to the HV_OUT terminal 88 and to a drain of a second NMOS current source transistor 162. The second NMOS current source transistor 162 has a source coupled to a ground reference terminal 124b. A gate terminal of the second NMOS current source transistor 162 is coupled to bias terminal 126.

The single-ended LV_OUT output stage 150 includes a second PMOS output transistor 170 that has a gate terminal coupled to the output node 130 and a source terminal coupled to the Vout output terminal 56. A drain of the second PMOS output transistor 170 is coupled to a drain of a pass gate NMOS transistor 172. A gate of the pass gate NMOS transistor 172 is coupled to a Vdd voltage source. A drain of the pass gate NMOS transistor 172 is coupled to the low voltage out terminal 90 and to a drain of a third NMOS current source transistor 174. The third NMOS current source transistor 174 has a source coupled to a ground reference terminal 124c. A gate terminal of the third NMOS current source transistor 174 is coupled to the bias terminal 126.

The pass gate NMOS transistor 172 operates to limit the voltage at the LV_OUT terminal 90 to Vdd-Vt, where Vt is the threshold voltage of the pass gate NMOS transistor 172. This provides logic level output signals for the LV_OUT signal, which is coupled to the second input terminal of the AND gate 62 of FIG. 3.

FIG. 5 illustrates various voltages for the voltage generator system of FIG. 3. As the HV_PUMP 54 starts, the Vout voltage rises from a quiescent Vdd level toward a target voltage of 15.5 volts, which is reached after a time interval. A regulated Vout voltage remains at the target level of 15.5 volts, while an unregulated Vout voltage continues to increase. The minus voltage from the voltage divider 92 tracks Vout from Vdd/2 to 7.75 volts. The plus voltage rises from Vdd to 7.75 volts, at which point the Zener diode configuration 96 limits the plus voltage to 7.75 volts. While the 7.75 plus voltage from the Zener diode configuration 96 is greater than the minus voltage from the voltage divider 100, the HV_OUT and LV-OUT signals remain at 0 volts, or a logic LOW level. The plus voltage equals or exceeds the minus voltage when Vout gets to 1.5 volts so that the HV_OUT and LV-OUT signals go to logic HIGH levels.

With reference to FIGS. 3, 4, and 5, the present invention provides a method of regulating a dual-mode charge pump 54 using multiple control options provided by external control signals including the option stop control signal and the option pull down control signal. The method includes controlling the dual-mode charge pump circuit 54 that provides at a Vout output terminal 56 a Vout output voltage that has two levels: a low voltage Vout output voltage Vdd and a high voltage Vout output voltage Vpp. The current sinking transistor 70 is coupled between the Vout output terminal 56 and the ground reference terminal through the current sink switch transistor 74. The reference voltage source 92 uses a Zener diode configuration 96 to supply a fixed reference voltage to the plus input terminal of the op amp 80. The voltage divider 100 supplies a voltage divider output voltage that is proportional to the Vout output voltage to the minus input terminal of the op amp 80. The op amp 80 compares the fixed reference voltage to the voltage divider output voltage and, if the voltage divider output voltage is less than the fixed reference voltage, provides a high voltage HV_OUT signal at output terminal 72 and a logic level LV_OUT signal at terminal 90. The current sink transistor 70 is activated with the HV_OUT signal and the current sink transistor switch 74 is activated with an external OPTION_PD signal, such that Vout is held constant and excess current from the charge pump is sunk to the ground reference through the activated current sink transistor 70.

To control the charge pump 54, the external high voltage enable control signal is combined with the low voltage out control signal in the AND gate 62 to provide an active high voltage enable signal to turn on the charge pump 54 and to provide a high voltage Vout output voltage Vpp at a Vout output terminal of the charge pump. The charge pump 54 is turned off when the high voltage enable control signal is inactive, that is, when the external option stop control signal is inactive or the low voltage out signal is inactive.

Operation of the current sinking transistor 70 is controlled by the high voltage out signal and the option pull down external control signal. Operation of the charge pump is controlled by the low voltage out control signal and the option stop control signal.

Optionally, the low voltage out control signal is coupled directly to the high voltage enable terminal of the charge pump 54 such that the low voltage out signal alone controls the high voltage Vout output voltage VPP.

Comparing the fixed reference voltage to the voltage divider output voltage is obtained by providing the fixed reference voltage and the voltage divider output voltage at input terminals of the op amp 80 that has a differential input stage which is a common source differential amplifier with current mirror loading, as described in connection with the description of FIG. 4.

Operation of the current sinking transistor is controlled by the high voltage out signal and the Operation of the current sinking transistor is controlled by the high voltage out signal and the option pull down external control signal. Operation of the charge pump is controlled by the low voltage out control signal and the option stop control signal.

Generating the reference voltage includes coupling a Zener diode configuration between the Vout terminal and the ground reference. A voltage supply terminal of the op amp is coupled to the Vout voltage so that the charge pump provides current for the Zener diode configuration.

The low voltage out signal is coupled directly to the high voltage enable terminal of the charge pump such that the LV_OUT signal alone controls the high voltage Vout output voltage Vpp.

Comparing the fixed reference voltage to the voltage divider output voltage is obtained by providing the fixed reference voltage and the voltage divider output voltage at input terminals of an op amp circuit that has a differential input stage which is a common source differential amplifier with current mirror loading.

The control options provided by the OPTION_STOP signal and the OPTION_PD signal determine how the Vout signal is regulated, or not regulated, at the target voltage of 15.5 volts. The HIGH or LOW states of the OPTION_STOP signal and the OPTION_PD signal are controlled as desired by a user to obtain various, multiple types of regulation of the Vout voltage level. A LOW state is zero volts or a logic LOW. As an example, an appropriate signal level voltage for a HIGH state is a logic HIGH at 3.75 volts, Vdd at 5 volts, and Vpp at 15.75 volts, as appropriate. A number of other appropriate voltage levels for active devices are used as required.

One option is for OPTION_PD to be HIGH and OPTION_STOP to be LOW. In this case, the NMOS current sink control switch transistor 74 is turned on to activate the NMOS current sink transistor 70 so that Vout is regulated by sinking extra charge to ground through the NMOS current sink transistor 70. In this case Vout does not rise.

Another option is for OPTION_PD to be LOW and OPTION_STOP to be HIGH. In this case, the high voltage enable signal is LOW and the HV_PUMP is suspended from operation to prevent Vout from rising. This conserves power. The NMOS current sink control switch transistor 74 is turned off so that the NMOS current sink transistor 70 is not effective in sinking current. A HIGH level for the OPTION_STOP signal allows the LV_OUT logic signal to enable the HV_PUMP 54 by activating the high voltage enable signal when the minus signal voltage is less than the plus signal voltage.

A further option is for both OPTION_PD and OPTION_STOP to be HIGH. In this case the NMOS current sink transistor 70 Vout is active to regulate Vout by sinking extra charge. The LV_OUT signal controls operation of the HV_PUMP to keep Vout regulated.

The high-voltage level of Vout, such a 15.75 volts, for example, is used as the voltage supply for the op amp 80 because the scaled down or proportionate high voltage output level is compared to a 7.75 volt reference level. The dual output signals of the op amp 80 are needed because high voltage HV_OUT signal controls the high voltage current sink transistor 70 and the low voltage LV_OUT signals control provide logic level control signals for the AND 62 charge pump control circuit. The LV_OUT circuit of the op amp 80 includes the pass gate transistor to hole the LV_OUT signal voltage level to a logic level that is less than the Vdd level.

A still further option is to use LV_OUT to directly control the HV_PUMP with both OPTION_PD and OPTION STOP at HIGH levels.

The foregoing description of a specific embodiment of the present invention has been presented for purposes of illustration and description. It is not intended to be exhaustive or to limit the invention to the precise forms disclosed, and obviously many modifications and variations are possible in light of the above teaching. The embodiment was chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A voltage generator system having multiple control options, comprising:
   a dual-mode voltage generator that has an output terminal that is controlled by a control circuit and that provides a high-voltage output or a low-voltage output;
   a current shunt transistor that is coupled to the output terminal and a ground terminal through a shunt control switch that is actuated by an optional pull-down control signal;
   a dual output op amp that compares a fixed voltage reference to a voltage proportional to the output, that has a high voltage output terminal which is coupled to a gate terminal of the current shunt transistor, that has a low voltage output signal; and
   the control circuit is controlled by an optional stop signal and the low voltage output signal to provide a signal to control the dual-mode voltage generator.

2. The voltage generator system of claim 1 wherein the dual-mode high-voltage charge pump control circuit includes an AND gate that has an output terminal which is coupled to the enable input terminal of the dual-mode high-voltage charge pump, that has a first input terminal that receives an option stop control signal, and that has a second input terminal that receives a low voltage out signal.

3. The voltage generator system of claim 1:
   wherein the dual-output op amp includes an n-channel common-source differential amplifier input stage that has current-mirror loading using p-channel current-mirror transistors; and
   wherein the dual-output op amp includes a low voltage output stage and a high voltage output stage.

4. The voltage generator system of claim 3 wherein the high voltage output stage includes a first PMOS transistor that has a gate terminal coupled to an output terminal of the n-channel common-source differential amplifier input stage, that has a source coupled to the Vout output terminal, and that has a drain coupled to the high voltage out terminal and through a first bias current source to the ground reference terminal.

5. The voltage generator system of claim 3 wherein the low voltage out output stage includes a second PMOS transistor that has a gate terminal also coupled to the output terminal of the n-channel common-source differential amplifier input stage, that has a source also coupled to the Vout output terminal, and that has a drain coupled to a source of a pass gate NMOS transistor.

6. A voltage generator system having multiple control options, the system comprising:
   a dual-mode voltage generator that has a Vout output terminal at which is provided a Vout voltage level, that has high voltage input terminal at which is provided a high voltage enable control signal which is active to provide a high-voltage Vout voltage level and which is inactive to provide a low-voltage Vout voltage level;
   a voltage generator control circuit that has an output terminal which is coupled to the high voltage enable input terminal of the dual-mode voltage generator, that has a first input terminal which receives an option stop external control signal which is inactive to provide the low-voltage Vout voltage level Vdd from the dual-mode voltage generator, and that has a second input terminal which receives a low voltage out signal;
   a current sink transistor that is provided with a current sink control switch that is activated to couple the current sink transistor between the Vout output terminal and a ground reference terminal, said current sink transistor having a gate terminal at which is received a high voltage out control signal and said current sink control switch having a control terminal at which is received an option pull down external control signal which is active to operate the current sink control switch;
   a dual output op amp that has a power terminal coupled to the Vout output terminal of the voltage generator, that has a minus input terminal, that has a plus input terminal, that has a high voltage high voltage out terminal which is coupled to a gate terminal of the current sink transistor, at which gate terminal is provided the high voltage out signal as a control signal, and that has a low voltage terminal at which is provided the low voltage out signal as a logic level control output signal that is coupled to the second input terminal of the voltage generator control circuit;
   a reference voltage source that provides a fixed reference voltage at an output terminal which is coupled to the plus input terminal of the dual output op amp;
   a voltage divider circuit that is coupled between the Vout output terminal and the ground reference terminal, that has an output terminal which is coupled to the minus input terminal of the dual output op amp and which provides an output signal that is proportional to the Vout voltage level;
   wherein an active high voltage enable control signal causes the dual-mode voltage generator to provide the high-voltage Vout voltage level Vpp and wherein an inactive high voltage enable control signal causes the dual-mode voltage generator to provide a low-voltage Vdd Vout voltage level Vdd; and
   wherein an active option pull down external control signal causes the current sink control switch to close and the current sink transistor to be activated.

7. The voltage generator of claim 6 wherein the dual-mode voltage generator includes a dual-mode charge pump circuit that provides the high-voltage Vout voltage level and that provides the low-voltage Vout logic voltage level.

8. The voltage generator of claim 6 wherein the current sink control switch that is activated to couple the current sink transistor between the Vout output terminal and a ground reference terminal is a transistor that has a gate terminal at which is received the option pull down external control signal.

9. The voltage generator of claim 6 wherein the voltage generator control circuit includes an AND gate that has an output terminal which is coupled to the high voltage enable input terminal of the high-voltage generator, that has a first input terminal that receives the option stop control signal, and that has a second input terminal that receives a low voltage out signal from the dual-output op amp.

10. The voltage generator of claim 6 wherein the reference voltage source includes a first resistor coupled from the Vout output terminal to the plus input terminal of the dual-output op amp and also includes a Zener diode configuration coupled between the plus input terminal of the dual output op amp and the ground reference terminal.

11. The voltage generator of claim 6:
    wherein the dual-output op amp includes an n-channel common-source differential amplifier input stage that has current-mirror loading using p-channel current-mirror transistors; and
    wherein the dual-output op amp includes an low voltage out output and a high voltage out output stage.

12. The voltage generator of claim 11 wherein the HV_OUT output stage includes a first PMOS transistor that has a gate terminal coupled to an output terminal of the n-channel common-source differential amplifier input stage, that has a source coupled to the Vout output terminal, and that has a drain coupled to the high voltage out terminal and through a first bias current source to the ground reference terminal.

13. The voltage generator of claim 11 wherein the LV_OUT stage includes a second PMOS transistor that has a gate terminal also coupled to the output terminal of the n-channel common-source differential amplifier input stage, that has a source also coupled to the Vout output terminal, and that has a drain coupled to a source of the pass gate NMOS transistor.

14. The voltage generator of claim 13 wherein a gate of the pass gate NMOS transistor is coupled to a Vdd voltage source, wherein a source of the pass gate NMOS transistor is coupled through a second bias current source to the ground reference terminal, and wherein the source of the pass gate NMOS transistor is coupled to the low voltage out terminal to limit the voltage to Vdd-Vt, threshold voltage, for the voltage limiter NMOS transistor and to provide logic level output levels for the low voltage out signal which is coupled to the second input terminal of the voltage generator control circuit.

15. The voltage generator of claim 6 wherein the voltage divider circuit includes a second resistor coupled from the high-voltage generator output terminal to the plus input terminal of the dual-output op amp and includes a third resistor that is coupled between the plus input terminal of the dual-output op amp and the ground reference terminal.

16. A control circuit providing multiple control options for controlling a dual-mode high-voltage charge pump, the circuit comprising:
   a dual-mode high-voltage charge pump control circuit that is adapted to control operation of a dual-mode high-voltage charge pump, that has an output terminal that is adapted to be coupled to an enable input terminal of the dual-mode high-voltage charge pump, that has a first input terminal that is adapted to receive an OPTION_STOP external control signal, and that has a second input terminal that is adapted to receive a LV_OUT logic control signal;
   a current sink transistor that is coupled in series with a switch transistor between the high-voltage generator output terminal and a ground reference terminal, said switch transistor having a gate that is adapted to receive an OPTION_PD external control signal to couple the current sink transistor to the ground reference terminal;
   a dual output op amp that has a power terminal coupled to the dual-mode high-voltage charge pump output terminal, that has a minus input terminal and a plus input terminal, that has a high voltage out terminal coupled to a gate terminal of the shunt transistor, and that has a low voltage out terminal coupled to the second input terminal of the dual-mode high-voltage charge pump control gate;
   a reference voltage circuit including a first resistor coupled from the dual-mode high-voltage charge pump output terminal to the minus input terminal of the dual output op amp and including a Zener diode configuration coupled between the minus input terminal of the dual output op amp and the ground reference terminal;
   a voltage divider circuit including a second resistor coupled from the high-voltage generator output terminal to the plus input terminal of the dual output op amp and including a third resistor that is coupled between the plus input terminal of the dual output op amp and the ground reference terminal;
   wherein an active HV_ENABLE control signal causes the dual-mode high-voltage charge pump to provide a high-voltage Vout voltage level and wherein an inactive HV_ENABLE control signal causes the dual-mode high-voltage charge pump to provide a low-voltage Vout voltage level; and
   wherein an active option pull down control signal causes the switch to close and the current sink transistor to be active.

17. The control circuit of claim 16 wherein the dual-mode high-voltage charge pump control circuit includes an AND gate that has an output terminal which is coupled to the enable input terminal of the dual-mode high-voltage charge pump, that has a first input terminal that receives an option stop control signal, and that has a second input terminal that receives a low voltage out signal.

18. The control circuit of claim 16:
   wherein the dual-output op amp includes an n-channel common-source differential amplifier input stage that has current-mirror loading using p-channel current-mirror transistors; and
   wherein the dual-output op amp includes a low voltage output stage and a high-voltage output stage.

19. The control circuit of claim 18 wherein the high voltage output stage includes a first PMOS transistor that has a gate terminal coupled to an output terminal of the n-channel common source differential amplifier input stage, that has a source coupled to the Vout output terminal, and that has a drain coupled to the high voltage out terminal and through a first bias current source to the ground reference terminal.

20. The control circuit of claim 18 wherein the low voltage out output stage includes a second PMOS transistor that has a gate terminal also coupled to the output terminal of the n-channel common-source differential amplifier input stage, that has a source also coupled to the Vout output terminal, and that has a drain coupled to a source of a pass gate NMOS transistor.

21. The control circuit of claim 20 wherein a gate of the pass gate NMOS transistor is coupled to a Vdd voltage source, wherein a source of the pass gate NMOS transistor is coupled through a second bias current source to the ground reference terminal, and wherein the source of the pass gate NMOS transistor is coupled to the LV_OUT terminal to limit the voltage to Vdd-Vt, threshold voltage, for the voltage limiter NMOS transistor and to provide logic level output levels for low voltage out signals which are coupled to the second input terminal of the voltage generator control circuit.

22. A method of regulating a dual-mode charge pump having multiple control options, the method comprising the steps of:
   controlling a dual-mode charge pump circuit to provide a Vout output voltage that includes a low voltage output voltage and a high voltage output voltage at a Vout output terminal;
   coupling a current sinking transistor between the output terminal and a ground reference terminal through a current sink switch transistor;
   supplying a fixed reference voltage;
   supplying a voltage divider output voltage that is proportional to the Vout output voltage;
   comparing the fixed reference voltage to the voltage divider output voltage and, if the voltage divider output voltage is less than the fixed reference voltage, providing a high voltage out signal and also providing a logic level low voltage output signal;
   activating the current sink transistor with the high voltage out signal and activating the current sink switch with an external optional pull down signal, such that the output signal is held constant and excess current from the charge pump is sunk to the ground reference through the activated current sink transistor;

combining an external high voltage enable control signal with the low voltage out control signal to provide an active high voltage enable signal at a high voltage enable terminal of the charge pump to turn on the charge pump and provide a high voltage Vout output voltage Vpp at the Vout output terminal of the charge pump;

turning off the charge pump when the high voltage enable control signal is inactive when the external optional stop control signal is inactive or the low voltage out signal is inactive;

wherein operation of the current sinking transistor is controlled by the high voltage out signal and the optional pull down external control signal; and wherein operation of the charge pump is controlled by the low voltage control signal and the optional stop control signal.

23. The method of claim 22 wherein the low voltage out signal is coupled directly to the high voltage enable terminal of the charge pump such that the low voltage out signal along controls the high voltage output voltage.

24. The method of claim 22 wherein comparing the fixed reference voltage to the voltage divider output voltage is obtained by providing the fixed reference voltage and the voltage divider output voltage at input terminals of an op amp circuit that has a differential input stage which is a common source differential amplifier with current mirror loading.

25. The method of claim 24 wherein the step of generating the reference voltage includes coupling a Zener diode configuration between the Vout terminal and the ground reference; and including the step of coupling a voltage supply terminal of the op amp to the Vout voltage so that the charge pump provides current for the Zener diode configuration.

* * * * *

UNITED STATES PATENT AND TRADEMARK OFFICE
CERTIFICATE OF CORRECTION

PATENT NO. : 7,427,890 B2
APPLICATION NO. : 11/618049
DATED : September 23, 2008
INVENTOR(S) : Chan It is certified that error appears in the above-identified patent and that said Letters Patent is hereby corrected as shown below:

In column 1, line 25, delete "T_clamp" and insert -- I_clamp --, therefor.

In column 2, line 11, delete "minimum" and insert -- minus --, therefor.

In column 2, line 18, delete "plug" and insert -- plus --, therefor.

In column 2, line 20, delete "group" and insert -- ground --, therefor.

In column 3, line 52, delete "invention;" and insert -- invention: --, therefor.

In column 3, line 61, after "FIG. 3 is" delete "a".

In column 4, line 23, delete "52." and insert -- 62. --, therefor.

In column 5, line 46, delete "89" and insert -- 88 --, therefor.

In column 5, line 49, delete "HV PUMP," and insert -- HV_PUMP, --, therefor.

In column 6, line 61, delete "LV-OUT" and insert -- LV_OUT --, therefor.

In column 6, line 63, delete "LV-OUT" and insert -- LV_OUT --, therefor.

In column 7, line 41, delete "VPP." and insert -- Vpp. --, therefor.

In column 7, lines 49-50, below "FIG. 4." delete "Operation of the current sinking transistor is controlled by the high voltage out signal and the". (Repeated Paragraph)

In column 8, line 40, after "such" delete "a" and insert -- as --, therefor.

In column 8, line 49, delete "hole" and insert -- hold --, therefor.

In column 8, line 53, delete "OPTION STOP" and insert -- OPTION_STOP --, therefor.

In column 10, line 64, in Claim 11, delete "output and" and insert -- output stage and --, therefor.

UNITED STATES PATENT AND TRADEMARK OFFICE
CERTIFICATE OF CORRECTION

PATENT NO. : 7,427,890 B2  Page 2 of 2
APPLICATION NO. : 11/618049
DATED : September 23, 2008
INVENTOR(S) : Chan It is certified that error appears in the above-identified patent and that said Letters Patent is hereby corrected as shown below:

In column 12, line 23, in Claim 18, delete "high-voltage" and insert -- high voltage --, therefor.

In column 14, line 3, in Claim 23, delete "along" and insert -- alone --, therefor.

Signed and Sealed this

Sixteenth Day of December, 2008

JON W. DUDAS
*Director of the United States Patent and Trademark Office*